United States Patent [19]

Liu et al.

[11] Patent Number: 5,560,800
[45] Date of Patent: Oct. 1, 1996

[54] PROTECTIVE COATING FOR PRESSURE-ACTIVATED ADHESIVES

[75] Inventors: Leland L. Liu, Fairport; Leland W. Reid, Palmyra; John R. Wagner, Jr., Rochester, all of N.Y.

[73] Assignee: Mobil Oil Corporation, Fairfax, Va.

[21] Appl. No.: 297,930

[22] Filed: Aug. 31, 1994

[51] Int. Cl.$^6$ .................................................. B32B 31/12
[52] U.S. Cl. ..................... 156/289; 428/352; 427/208.8; 427/574; 427/579
[58] Field of Search .................... 156/289, 90; 428/352; 427/208.4, 208.8, 574, 489, 516, 579

[56] References Cited

U.S. PATENT DOCUMENTS

| | | |
|---|---|---|
| 3,554,835 | 1/1971 | Morgan ............................... 156/289 X |
| 3,663,265 | 5/1972 | Lee et al. . |
| 3,740,287 | 6/1973 | Eichhorn ................................. 427/516 |
| 3,813,280 | 5/1974 | Olszyk et al. ....................... 156/289 X |
| 4,365,587 | 12/1982 | Hirose et al. . |
| 4,673,588 | 6/1987 | Bringmann et al. ..................... 427/489 |
| 4,675,206 | 6/1987 | Ikegaya et al. . |
| 4,688,069 | 8/1987 | Joy et al. . |
| 4,714,655 | 12/1987 | Bordoloi et al. . |
| 4,756,964 | 7/1988 | Kincaid et al. . |
| 5,000,831 | 3/1991 | Osawa et al. . |
| 5,132,173 | 7/1992 | Hashimoto et al. . |
| 5,137,780 | 8/1992 | Nichols et al. . |
| 5,230,931 | 7/1993 | Yamazaki et al. . |
| 5,288,504 | 2/1994 | Versic . |
| 5,427,824 | 6/1995 | Inushima et al. ................... 427/489 X |

FOREIGN PATENT DOCUMENTS

| | | | |
|---|---|---|---|
| 3225023 | 2/1983 | Germany ............................... 428/352 |
| 238630 | 8/1986 | Germany ............................... 427/489 |
| 3196679 | 8/1988 | Japan ..................................... 428/352 |
| 3264610 | 11/1991 | Japan ..................................... 427/489 |
| 1541311 | 2/1979 | United Kingdom ................... 156/289 |

OTHER PUBLICATIONS

"Direct Polymer Coating via Polymerization of Gaseous Intermediates, " Chung Lee, Ind. Eng. Chem. Prod. Res. Dev., 1978.

*Primary Examiner*—David A. Simmons
*Assistant Examiner*—Steven J. Helmer
*Attorney, Agent, or Firm*—Ronald A. Bleeker; Dennis P. Santini

[57] ABSTRACT

A pressure-sensitive coating for reducing seal is applied to an exposed surface of a pressure-activated adhesive. The coating is preferably deposited on the exposed surface of the adhesive by decomposition of a decomposable precursor in the presence of plasma. The employed decomposable precursor may include a hydrocarbon gas whereby an amorphous layer of interconnected carbon atoms is deposited on the surface of the adhesive, or a silicone-containing compound whereby the deposited coating is an amorphous layer of interconnected silicone and oxygen atoms.

7 Claims, No Drawings

PROTECTIVE COATING FOR PRESSURE-ACTIVATED ADHESIVES

BACKGROUND OF THE INVENTION

The present invention relates to substrates provided with a layer of adhesive and, more particularly, relates to interim protective coatings therefor.

Pressure-activated adhesives are known in the art. As the name implies, pressure-activated adhesives require direct application of pressure to the adhesive to promote bonding between such adhesive and the contacting article. Commonly employed pressure-activated adhesives include acrylic-based coatings and rubber-based cold seal coatings. These coatings may be applied to various films formed from polymers, metals, boxboard, paper, etc.

When the film is thereafter wound onto a core to form a roll, the exposed adhesive may have a tendency to adhere to the adjacent rolled layer, i.e., the adhesive has a tendency to adhere to itself under low pressure. To protect the exposed adhesive during rolling and preuse handling, a peelable release paper is commonly secured over the adhesive. This release paper is then removed prior to use of the film, thereby exposing the underlying adhesive. Other practices for protecting the exposed adhesive include applying a release coating to the side of a contacting surface opposite the adhesive.

Accordingly, there exists a need in the art for a method of providing protection for a pressure-activated adhesive in the absence of a separate peelable release paper or release coating.

SUMMARY OF THE INVENTION

The present invention, which addresses the needs of the art, relates to a film structure. The film structure includes a substrate. The film structure also includes a pressure-activated adhesive having an exposed surface and secured to the substrate. The structure further includes a pressure-sensitive coating secured to the exposed surface for reducing the adhesiveness of the underlying adhesive until application of a predetermined level of pressure to the coating.

The present invention also relates to a method of providing protection for an exposed surface of a pressure-activated adhesive. The method includes the step of applying a pressure-sensitive coating to an exposed surface of a pressure-activated adhesive. The coating reduces the tendency of the underlying adhesive to adhere to a contacting article until application of a predetermined level of pressure to the coating.

The pressure-activated adhesive is preferably coated through the process of plasma enhanced chemical vapor deposition. In one embodiment of the present invention, the decomposable precursor is a hydrocarbon gas whereby the deposited coating is an amorphous layer of interconnected carbon molecules, while in another embodiment of the present invention the decomposable precursor is a silicon-containing compound whereby the deposited coating is an amorphous layer of primarily interconnected silicon and oxygen atoms.

The present invention further provides a method of adhering a film to another article. The method includes the step of providing a film. The film includes a pressure-activated adhesive which is secured to a substrate. The adhesive is temporarily protected by a pressure-sensitive coating. The method includes the further step of placing the film in intimate contact with an article to be adhered thereto such that the coating contacts the article. Finally, the method includes the step of applying a predetermined level of pressure to the coating thereby disrupting the coating and allowing the adhesive to adhere to the article.

Finally, the present invention provides a film structure produced by the process of applying a pressure-activated adhesive to at least one side of a substrate. The process includes the further step of depositing a pressure-sensitive coating on an exposed surface of the adhesive by decomposition of a decomposable precursor in the presence of plasma whereby the coating provides interim protection for the adhesive.

As a result, the present invention sets forth a method of providing protection for a pressure-sensitive adhesive in the absence of a separate peelable release paper, or a release coating on the opposite side.

DETAILED DESCRIPTION OF THE INVENTION

As described hereinbelow, films which include pressure-activated adhesives may be temporarily protected by the application of a pressure-sensitive coating. The coating provides protection for the underlying adhesive during the period of time prior to use of such film, e.g., during pre-use handling, storage and shipping of the film. In particular, the coating reduces the seal of the film, thereby reducing the tendency of the film to adhere to an adjacent contacting layer when the film is wound onto a roll and to adhere to surfaces contacted during handling of such film.

The pressure-sensitive coating of the present invention is preferably a thin, relatively brittle layer which continuously covers the exposed surface of the pressure-activated adhesive. The coating, due to its thickness and brittleness, is readily frangible. Specifically, the coating may be disrupted by application of a predetermined level of pressure thereto. The level of pressure necessary to disrupt the coating (and thereby allow firm bonding between the underlying adhesive and the contacting article) is preferably commensurate with the level of pressure imparted on the adhesive during use thereof.

As mentioned, the protective coating may be disrupted by application of a predetermined level of pressure thereto. The coating, however, remains adhered to the underlying adhesive. As a result, the coating becomes part of the resultant adhesive matrix without flaking or peeling.

The pressure-activated adhesives contemplated by the present invention include adhesives such as acrylic-based coatings and hot-melt adhesives such as polyolfins or mixtures thereof. These adhesives may be employed in applications such as flexible packaging for food and general overwrap.

It is contemplated that a number of substrates can be employed in the present invention. For example, the aforementioned adhesives may be applied to polymeric films produced from polyolefins, polyesters, nylons, polycarbonate, polyvinyl chloride and polystyrene. The polyolefins, specifically polypropylene and polyethylene, are particularly preferred substrates to be utilized with the present invention. The adhesive may also be applied to such substrates as metallic foils, boxboards, paper, or glassine.

In one preferred embodiment, a substrate particularly adapted for use as a flexible food package is coated with a pressure-activated adhesive. A pressure-sensitive coating is then applied over the adhesive. Thereafter, the substrate is formed into a package by folding such substrate and overlapping the edges thereof. These edges are then adhered to one another by application of local pressure thereto which disrupts the protective coating and allows the underlying adhesive to bond to the opposing surface along such edges. The layer of adhesive interiorly located to the sealed edges remains protected by the pressure-sensitive coating. As a result, the pressure-sensitive coating of the present invention provides interim protection for the underlying adhesive located along the subsequently-formed edges and enduring protection for the remaining area of unsealed adhesive.

The coating of the present invention, which is preferably deposited onto the exposed surface of the pressure-activated adhesive, may be produced by the decomposition of a gaseous precursor. This decomposition is preferably accomplished through the process of plasma-enhanced chemical vapor deposition (PECVD), which allows the coating to be deposited on low-temperature substrates such as polymeric films. Particularly, the PECVD technique allows the coating material to be deposited at lower reaction chamber temperatures, as compared to the reaction chamber temperatures required in other deposition processes.

In one embodiment of the invention, the protective coating includes a layer of interconnected amorphous carbon atoms. The decomposable precursor utilized to form this amorphous carbon coating is a hydrocarbon gas. This may include, but is not limited to, hydrocarbon gases having from about 1 to 20 carbon atoms. Acetylene is one particularly preferred decomposable precursor gas.

In an alternative embodiment of the present invention, the protective coating includes a layer of primarily interconnected silicon and oxygen atoms. The decomposable precursor utilized to form the silicon-oxygen coating is a silicon-containing compound. Hexamethyldisiloxane (HMDSO) is one particular preferred decomposable precursor gas.

Upon the introduction of the decomposable precursor to the plasma, the precursor gas decomposes and is thereafter deposited on the pressure-activated adhesive, which has previously been positioned in a suitable manner. This deposited coating may range in thickness from about 10 angstroms to about 5000 angstroms. The thickness of the coating will be primarily dependent on the amount of time allowed for deposition. Preferably, the deposition time ranges from about 0.01 seconds to about 60 seconds.

The thickness of the coating may be varied to affect the properties of such coating. For example, a relatively thin coating may be applied to those pressure-activated adhesives which require only minimum protection, while a thicker coating may be applied to those pressure-activated adhesives requiring higher levels of protection.

The plasma in the present invention is generated by the application of a primary radio frequency to a first electrode. This radio frequency excites the gas mixture flowing through the chamber, thereby forming a plasma. The gas mixture utilized to form the amorphous carbon coating is preferably a mixture of the hydrocarbon precursor gas mentioned above, e.g., acetylene, and an inert gas such as argon. The gas mixture utilized to form the silicon-oxygen coating is preferably a mixture of the silicon containing compound mentioned above, e.g., Hexamethyldisiloxane (HMDSO) and Oxygen ($O_2$).

Apparatuses adapted for PECVD are commercially available. Such apparatuses generally include a chamber sized for receipt of a substrate. The apparatus additionally includes a vacuum pump for evacuating the chamber, means for introducing a gas mixture to the chamber under controlled conditions, and means for generating a plasma within the chamber.

In one particularly preferred embodiment, the plasma generation means includes distally-spaced first and second electrodes, which together can be employed to introduce independent dual energy sources into the reaction chamber. A primary radio frequency of about 13.56 MHz is applied to the first electrode and a secondary frequency of from about 10 KHz to 1 MHz is applied to the second electrode. Preferably, the chamber serves as the ground for both frequencies.

The primary frequency generates the plasma (by exciting the gas mixture), while the secondary frequency is believed to facilitate the deposition of the carbon on the substrate by exciting the carbon molecules being deposited. This rationale is supported by the fact that a visible change in the plasma is observed upon application of this second radio frequency.

Other means of generating the plasma are also contemplated. For example, microwave energy of about 2.45 GHz could function as the primary electrode. In addition, lasers or magnetic fields could be employed to excite the gas mixture.

The chamber preferably includes a substrate holder plate for supporting the film to be coated. This substrate holder plate is preferably integral with the second electrode. In addition, the substrate holder plate may include either a flat or an arcuate support surface. It is contemplated that the use of an arcuate support surface would facilitate commercial production of the films disclosed herein.

The following examples illustrate the encapsulation method of the present invention.

EXAMPLE I

Control sample 1 was produced. An uncoated orientated polypropylene film approximately 2 mil thick was coated with a rubbery hot-melt adhesive. Control Sample 1 was thereafter tested for crimp seal at 20 psi (crimp seal being a measurement in grams per inch of the degree of adhesiveness between the film and the contacting article). This pressure (i.e., 20 psi) was applied to the adhesive-coated substrate to simulate the normal handling conditions encountered prior to use of the film.

Control Sample 1 exhibited a crimp seal of 2300 g/in (at 20 psi).

EXAMPLE II

Samples 2, 3, 4, 5 and 6 were produced. Samples of oriented polypropylene film of approximately 2 mil thick were coated with a rubbery hot-melt adhesive. The samples were cut into 11 inch long by 15.5 inch wide sheets and mounted on a 10 inch by 15.5 inch substrate holder plate attached to the second electrode. The substrate holder plate included an arcuate surface having a 40 inch radius of curvature. The sample overhung the substrate holder plate along the length of such sample to allow the sample to be secured to the holder.

The chamber was pumped down to about 1 mTorr. A gas mixture was then introduced into the chamber at a specified flow rate. The pressure within the chamber was increased to a reaction pressure of about 100 mTorr by use of a gate valve located at the inlet of the vacuum pump. A primary radio frequency of about 13.5 MHz at a power level of 100 watts was applied to the first electrode and a secondary frequency of about 95 KHz at a power level of 50 watts was applied to the second electrode.

Individual samples were coated for various lengths of times ranging from 30–120 seconds. Thereafter, the gas mixture was shut off and the chamber pumped down to about 1 mTorr. The chamber vacuum was broken by bleeding in nitrogen gas and the respective sample was removed. Samples 2, 3, 4, 5 and 6 were each tested for crimp seal at both 20 psi and 80 psi (80 psi corresponding to the amount of pressure used to disrupt the pressure-sensitive coating).

EXAMPLE III

Sample 7 was produced. Propane, rather than acetylene, was employed as the decomposable precursor gas, and the procedure described in Example 2 was repeated. The sample was treated for approximately 30 seconds.

Sample 7 was thereafter tested for crimp seal at 20 psi and 80 psi.

EXAMPLE IV

Samples 8, 9, 10, 11, 12, 13 and 14 were produced. These samples were produced by utilizing a decomposable precursor gas mixture of Hexamethyldisiloxane (HMDSO) and Oxygen ($O_2$) at various flow rates in accordance with the procedure described in Example 2. Each sample was treated for approximately 30 seconds. The respective samples were thereafter removed and tested for crimp seal at both 20 psi and 80 psi.

The results from Example I–IV are summarized in the following table:

| Sample | Flow (sccm) | | | | | Coating Time (sec) | Crimp Seal @ 20 PSI (g/in) | Crimp Seal @ 80 PSI (g/in) |
| | $C_2H_2$ | $C_3H_8$ | Ar | HMDSO | $O_2$ | | | |
|---|---|---|---|---|---|---|---|---|
| 1  | —  | —  | —  | —  | —  | —   | 2300 | —   |
| 2  | 50 | 0  | 0  | 0  | 0  | 30  | 405  | 865 |
| 3  | 50 | 0  | 10 | 0  | 0  | 30  | 105  | 600 |
| 4  | 50 | 0  | 10 | 0  | 0  | 30  | 45   | 585 |
| 5  | 50 | 0  | 10 | 0  | 0  | 60  | 40   | 450 |
| 6  | 50 | 0  | 10 | 0  | 0  | 120 | 20   | 510 |
| 7  | 0  | 50 | 10 | 0  | 0  | 30  | 105  | 865 |
| 8  | 0  | 0  | 0  | 28 | 0  | 30  | 0    | 310 |
| 9  | 0  | 0  | 0  | 28 | 3.1| 30  | 40   | 375 |
| 10 | 0  | 0  | 0  | 28 | 7.0| 30  | 35   | 330 |
| 11 | 0  | 0  | 0  | 28 | 18.7| 30 | 55   | 320 |
| 12 | 0  | 0  | 0  | 28 | 80 | 30  | 140  | 410 |
| 13 | 0  | 0  | 0  | 10 | 90 | 30  | 245  | 950 |
| 14 | 0  | 0  | 0  | 28 | 0  | 30  | 20   | 170 |

It is apparent from the test data set forth in the previous table that the deposited coating provides significant protection to the adhesive-coated substrate. Particularly, the coating inhibits the adhesive-coated substrate from significantly adhering to itself or another article during conditions which simulate normal handling. For example, the measured crimp seal for Sample 6 (at 20 psi) was 20 g/in, which is significantly less than the measured crimp seal of 2300 g/in (at 20 psi) for Sample 1. Accordingly, if both Samples 1 and 6 were wound onto a roll, Sample 1 would have a significantly greater tendency to adhere to the adjacent contacting layer on the roll thereby hindering the unwinding of such roll.

When sufficient pressure is applied to disrupt the continuous coating (thereby releasing the adhesive), the adhesive-coated substrate can freely adhere to itself or another article. For example, when a pressure of 80 psi was applied to Sample 6, the coating was disrupted thus allowing access to the underlying adhesive. This is evidenced by the significant increase in crimp seal, i.e., the crimp seal increased from 20 g/in to 510 g/in.

Thus, while there have been described what are presently believed to be the preferred embodiments of the invention, those skilled in the art will realize that various changes and modifications may be made to the invention without departing from the spirit of such invention. All such changes and modifications which fall within the scope of the invention are therefore intended to be claimed.

What is claimed is:

1. A film structure, comprising:
   a substrate;
   a pressure-activated adhesive having an exposed surface and secured to said substrate; and
   a pressure-sensitive coating secured to said exposed surface for reducing the adhesiveness of said underlying adhesive until application of a predetermined level of pressure to said coating, wherein said coating comprises an amorphous layer of interconnected atoms, said atoms being chemically bonded to adjacent atoms in continuous fashion throughout the entire layer to provide a continuous frangible skin.

2. The film structure according to claim 1, wherein said coating comprises an amorphous layer of interconnected carbon atoms.

3. The film structure according to claim 1, wherein said coating comprises an amorphous layer of interconnected silicon and oxygen atoms.

4. The film structure according to claim 1, wherein said coating has a thickness from about 10 angstoms to about 5000 angstroms.

5. The film structure according to claim 1, wherein said pressure-activated adhesive is selected from the group consisting of acrylic-based coatings, cold seal coatings and hot melt adhesives.

6. The film structure according to claim 1, wherein said substrate is selected from the group consisting of polymeric films, metallic foils, boxboard, paper and glassine.

7. A film structure produced by the process comprising:
   applying a pressure-activated adhesive to at least one side of a substrate;
   decomposing a decomposable precursor in the presence of plasma; and depositing the decomposition product of the decomposable precursor to form a pressure-sensitive coating on an exposed surface of said adhesive whereby said coating provides interim protection for said adhesive, wherein said coating comprises an amorphous layer of interconnected atoms, said atoms being chemically bonded to adjacent atoms in continuous fashion throughout the entire layer to provide a continuous frangible skin.

* * * * *